(12) United States Patent
Akkarakaran et al.

(10) Patent No.: US 10,965,508 B2
(45) Date of Patent: Mar. 30, 2021

(54) SPACE-TIME BLOCK CODING SCHEMES FOR DFT-S-OFDM

(71) Applicant: QUALCOMM Incorporated, San Diego, CA (US)

(72) Inventors: Sony Akkarakaran, Poway, CA (US); Xiaoxia Zhang, San Diego, CA (US); Tao Luo, San Diego, CA (US)

(73) Assignee: Qualcomm Incorporated

( * ) Notice: Subject to any disclaimer, the term of this patent is extended or adjusted under 35 U.S.C. 154(b) by 0 days.

(21) Appl. No.: 16/522,440

(22) Filed: Jul. 25, 2019

(65) Prior Publication Data

US 2019/0349229 A1 Nov. 14, 2019

Related U.S. Application Data

(63) Continuation of application No. 15/819,750, filed on Nov. 21, 2017, now Pat. No. 10,404,511.

(60) Provisional application No. 62/425,933, filed on Nov. 23, 2016.

(51) Int. Cl.
| | |
|---|---|
| *H04L 27/26* | (2006.01) |
| *H04L 5/00* | (2006.01) |
| *H04L 1/06* | (2006.01) |
| *H04B 7/06* | (2006.01) |
| *H04J 13/00* | (2011.01) |

(52) U.S. Cl.
CPC ......... *H04L 27/261* (2013.01); *H04B 7/0669* (2013.01); *H04L 1/0643* (2013.01); *H04L 1/0668* (2013.01); *H04L 5/0023* (2013.01); *H04L 5/0048* (2013.01); *H04L 27/2613* (2013.01); *H04L 27/2636* (2013.01); *H04B 7/06* (2013.01); *H04J 13/0048* (2013.01)

(58) Field of Classification Search
CPC ... H04L 27/261; H04L 1/0643; H04L 1/0668; H04L 5/0023; H04L 5/0048; H04L 27/2613; H04L 27/2636; H04L 5/001; H04B 7/0669; H04B 7/06; H04J 13/0048
See application file for complete search history.

(56) References Cited

U.S. PATENT DOCUMENTS

| | | | |
|---|---|---|---|
| 8,548,006 B2 | 10/2013 | Ko et al. | |
| 9,106,389 B2 | 8/2015 | Luo et al. | |
| 9,571,140 B2 | 2/2017 | Thomas et al. | |
| 9,608,780 B2 | 3/2017 | Luo et al. | |
| 2010/0074244 A1 | 3/2010 | Luo et al. | |
| 2010/0290554 A1* | 11/2010 | Dai | H04L 25/03159 375/285 |

(Continued)

OTHER PUBLICATIONS

Ericsson, "On Phase Tracking in DFT-S-OFDM Waveform", 3GPP Draft, R1-1612338, 3rd Generation Partnership Project (3GPP), Mobile Competence Centre, 650, Route Des Lucioles, F-06921, Sophia-Antipolis Cedex, France, vol. RAN WG1, No. Reno, USA, XP051176287, Nov. 13, 2016 (Nov. 13, 2016), pp. 1-2.

(Continued)

*Primary Examiner* — Kibrom T Hailu
(74) *Attorney, Agent, or Firm* — Arent Fox, LLP

(57) ABSTRACT

An apparatus and method for transmission of a single-carrier waveform from multiple transmit antennas including both a reference signal and data in a discrete Fourier transform spread orthogonal frequency division multiplexing (DFT-s-OFDM) symbol.

30 Claims, 8 Drawing Sheets

(56) References Cited

U.S. PATENT DOCUMENTS

| | | | |
|---|---|---|---|
| 2011/0176632 A1* | 7/2011 | Jeong | H04B 7/0413 375/267 |
| 2011/0228815 A1 | 9/2011 | Nakamura et al. | |
| 2014/0161205 A1* | 6/2014 | Jalloul | H04L 5/0016 375/295 |
| 2014/0286255 A1 | 9/2014 | Nam et al. | |
| 2016/0094326 A1* | 3/2016 | Moon | H04L 5/0091 370/330 |
| 2018/0097593 A1* | 4/2018 | Dasilva | H04L 5/0073 |
| 2018/0145854 A1 | 5/2018 | Akkarakaran et al. | |

OTHER PUBLICATIONS

Fragouli C., et al., "Training-Based Channel Estimation for Multiple-Antenna Broadband Transmissions", IEEE Transactions on Wireless Communications, IEEE Service Center, Piscataway, NJ, US, vol. 2, No. 2, XP001158235, Mar. 1, 2003 (Mar. 1, 2003), pp. 384-391.

Gao X., et al., "Efficient Channel Estimation for MIMO Single-Carrier Block Transmission With Dual Cyclic Timeslot Structure", IEEE Transactions on Communications, IEEE Service Center, Piscataway, NJ, USA, vol. 55, No. 11, XP011197223, Nov. 1, 2007 (Nov. 1, 2007), pp. 2210-2223.

Hou Y., et al., "Channel Estimation Improvement for MIMO Single-Carrier Block Transmission System", ICC 2011, IEEE International Conference on Communications, Jun. 5-9, 2011, Kyoto, Japan, IEEE, Piscataway, NJ, USA, XP031908230, Jun. 5, 2011 (Jun. 5, 2011), pp. 1-6.

International Search Report and Written Opinion—PCT/US2017/062998—ISA/EPO—dated Mar. 12, 2018.

* cited by examiner

310

312

Generating a single-carrier waveform for a single transmit antenna including both a reference signal and data in multiple SC-FDM symbols, the reference signal comprises a PTRS

314

Transmit the single-carrier waveform via the signal transmit antenna

*FIG. 3B*

SPACE-TIME BLOCK CODING SCHEMES FOR DFT-S-OFDM

CROSS-REFERENCE TO RELATED APPLICATION(S)

This application is a continuation of U.S. patent application Ser. No. 15/819,750, entitled "Space-Time Block Coding Schemes for DFT-s-OFDM" and filed on Nov. 21, 2017, which claims the benefit of U.S. Provisional Application Ser. No. 62/425,933, entitled "SPACE-TIME BLOCK CODING SCHEMES FOR SC-FDM" and filed on Nov. 23, 2016, the disclosure of which are expressly incorporated by reference herein in their entirety.

BACKGROUND

Aspects of the present disclosure relate generally to wireless communication networks, and more particularly, to space-time block coding (STBC) schemes for discrete Fourier transform spread orthogonal division multiplexing (DFT-s-OFDM or DFT-spread OFDM) in in new radio (NR) (also referred to as $5^{th}$ generation (5G)) radio technologies.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, single-carrier frequency division multiple access (or multiplexing) (SC-FDMA) systems, and discrete Fourier transform spread orthogonal division multiplexing (DFT-s-OFDM) systems. It should be understood that SC-FDM and DFT-s-OFDM are two names of essentially similar technologies, however, DFT-s-OFDM is the terminology used in 3GPP specifications.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology, the NR physical layer includes physical channels encoded and transmitted on a single OFDM symbol. Examples of such physical channels include PDCCH on the downlink (DL), and short-PUCCH on the uplink (UL), and PDSCH/PUSCH in a 'mini-slot' transmission (where a mini-slot is a 1-symbol slot). SC-FDM and/or DFT-s-OFDM versions of the same transmissions are also desirable, such as in UL link-budget limited case, and also in the DL for high carrier frequency (e.g., >40 GHz) transmissions. Also, a transmit diversity scheme may be desired for such transmissions.

Thus, improvements in wireless communications for NR technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present aspects relate to using pilots inserted before the discrete Fourier transform (DFT) spreading as phase noise tracking reference signal (PTRS).

In an aspect of the disclosure, a method may include generating a single-carrier waveform including both a reference signal and data in a discrete Fourier transform spread orthogonal frequency division multiplexing (DFT-s-OFDM) symbol, and transmitting the single-carrier waveform from multiple transmit antennas.

In an aspect of the disclosure, a method may include transmitting a single-carrier waveform from a single transmit antenna including both a reference signal and data in multiple DFT-s-OFDM symbols, the reference signal comprises a phase noise tracking reference signal (PTRS).

In an aspect of the disclosure, a method for transmission of a waveform may include receiving modulation symbols, inputting a first portion of the modulation symbols into a first discrete Fourier transform to obtain a first symbol cluster, inputting a first second portion of the modulation symbols into a second discrete Fourier transform to obtain a second symbol cluster, multiplexing the first cluster and the second cluster as inputs into an inverse discrete Fourier transform to obtain a multi-cluster vector, space-time block encoding each of the first cluster and the second time domain cluster, inserting a reference signal into at least one symbol of each of the first time domain cluster and the second time domain cluster, and transmitting the multi-cluster vector.

In an aspect of the disclosure, a method of wireless communication may include receiving a first transmission from a first transmitter having overlay Walsh code data a in a first time domain symbol and also in a second time domain symbol, receiving a second transmission from a second transmitter having overlay Walsh code data b in the first time domain symbol and overlay Walsh code -b in the second time domain symbol, combining the symbols to decode the first transmission from the first transmitter and the second transmission from the second transmitter.

In an aspect of the disclosure, a wireless communication device comprises a memory and at least one processor in communication with the memory. The at least one processor may be configured to transmit a single-carrier waveform from multiple transmit antennas including both a reference signal and data in a DFT-s-OFDM symbol.

In an aspect of the disclosure, a wireless communication device comprises a memory and at least one processor in communication with the memory. The at least one processor may be configured to transmit a single-carrier waveform from a single transmit antenna including both a reference signal and data in multiple DFT-s-OFDM symbols, the reference signal comprises a PTRS.

In an aspect of the disclosure, a wireless communication device comprises a memory and at least one processor in communication with the memory. The at least one processor may be configured to receive modulation symbols, input a first portion of the modulation symbols into a first discrete Fourier transform to obtain a first symbol cluster, input a first second portion of the modulation symbols into a second discrete Fourier transform to obtain a second symbol cluster, multiplex the first cluster and the second cluster as inputs into an inverse discrete Fourier transform to obtain a multi-cluster vector, space-time block encode each of the first cluster and the second time domain cluster, insert a reference signal into at least one symbol of each of the first time domain cluster and the second time domain cluster, and transmit the multi-cluster vector.

In an aspect of the disclosure, a wireless communication device comprises a memory and at least one processor in communication with the memory. The at least one processor may be configured to receive a first transmission from a first transmitter having overlay Walsh code data a in a first time domain symbol and also in a second time domain symbol, receive a second transmission from a second transmitter having overlay Walsh code data b in the first time domain symbol and overlay Walsh code -b in the second time domain symbol, combine the symbols to decode the first transmission from the first transmitter and the second transmission from the second transmitter.

In an aspect of the disclosure, a wireless communication device may include means for transmitting a single-carrier waveform from multiple transmit antennas including both a reference signal and data in a DFT-s-OFDM symbol.

In an aspect of the disclosure, a wireless communication device may include means for transmitting a single-carrier waveform from a single transmit antenna including both a reference signal and data in multiple DFT-s-OFDM symbols, the reference signal comprises a PTRS.

In an aspect of the disclosure, a mea wireless communication device may include means for receiving modulation symbols, means for inputting a first portion of the modulation symbols into a first discrete Fourier transform to obtain a first symbol cluster, means for inputting a first second portion of the modulation symbols into a second discrete Fourier transform to obtain a second symbol cluster, multiplexing the first cluster and the second cluster as inputs into an inverse discrete Fourier transform to obtain a multi-cluster vector, space-time block encoding each of the first cluster and the second time domain cluster, means for inserting a reference signal into at least one symbol of each of the first time domain cluster and the second time domain cluster, and means for transmitting the multi-cluster vector.

In an aspect of the disclosure, a wireless communication device may include means for receiving a first transmission from a first transmitter having overlay Walsh code data a in a first time domain symbol and also in a second time domain symbol, means for receiving a second transmission from a second transmitter having overlay Walsh code data b in the first time domain symbol and overlay Walsh code -b in the second time domain symbol, means for combining the symbols to decode the first transmission from the first transmitter and the second transmission from the second transmitter.

A computer-readable medium storing computer code executable by a processor for wireless communications, comprising code for receiving a first transmission from a first transmitter having overlay Walsh code data a in a first time domain symbol and also in a second time domain symbol, receiving a second transmission from a second transmitter having overlay Walsh code data b in the first time domain symbol and overlay Walsh code -b in the second time domain symbol, combining the symbols to decode the first transmission from the first transmitter and the second transmission from the second transmitter.

In an aspect of the disclosure, a computer-readable medium storing computer code executable by a processor for wireless communications may include code for transmitting a single-carrier waveform from multiple transmit antennas including both a reference signal and data in a DFT-s-OFDM symbol.

In an aspect of the disclosure, a computer-readable medium storing computer code executable by a processor for wireless communications may include code for transmitting a single-carrier waveform from a single transmit antenna including both a reference signal and data in multiple DFT-s-OFDM symbols, the reference signal comprises a PTRS.

In an aspect of the disclosure, a computer-readable medium storing computer code executable by a processor for wireless communications may include code for receiving modulation symbols, code for inputting a first portion of the modulation symbols into a first discrete Fourier transform to obtain a first symbol cluster, code for inputting a first second portion of the modulation symbols into a second discrete Fourier transform to obtain a second symbol cluster, code for multiplexing the first cluster and the second cluster as inputs into an inverse discrete Fourier transform to obtain a multi-cluster vector, space-time block encoding each of the first cluster and the second time domain cluster, code for inserting a reference signal into at least one symbol of each of the first time domain cluster and the second time domain cluster, and code for transmitting the multi-cluster vector.

In an aspect of the disclosure, a computer-readable medium storing computer code executable by a processor for wireless communications may include code for receiving a first transmission from a first transmitter having overlay Walsh code data a in a first time domain symbol and also in a second time domain symbol, code for receiving a second transmission from a second transmitter having overlay Walsh code data b in the first time domain symbol and overlay Walsh code -b in the second time domain symbol, code for combining the symbols to decode the first transmission from the first transmitter and the second transmission from the second transmitter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 3A-3D are flow diagrams of example methods of wireless communication according to one or more aspects of the present disclosure;

DETAILED DESCRIPTION

Figure 1:
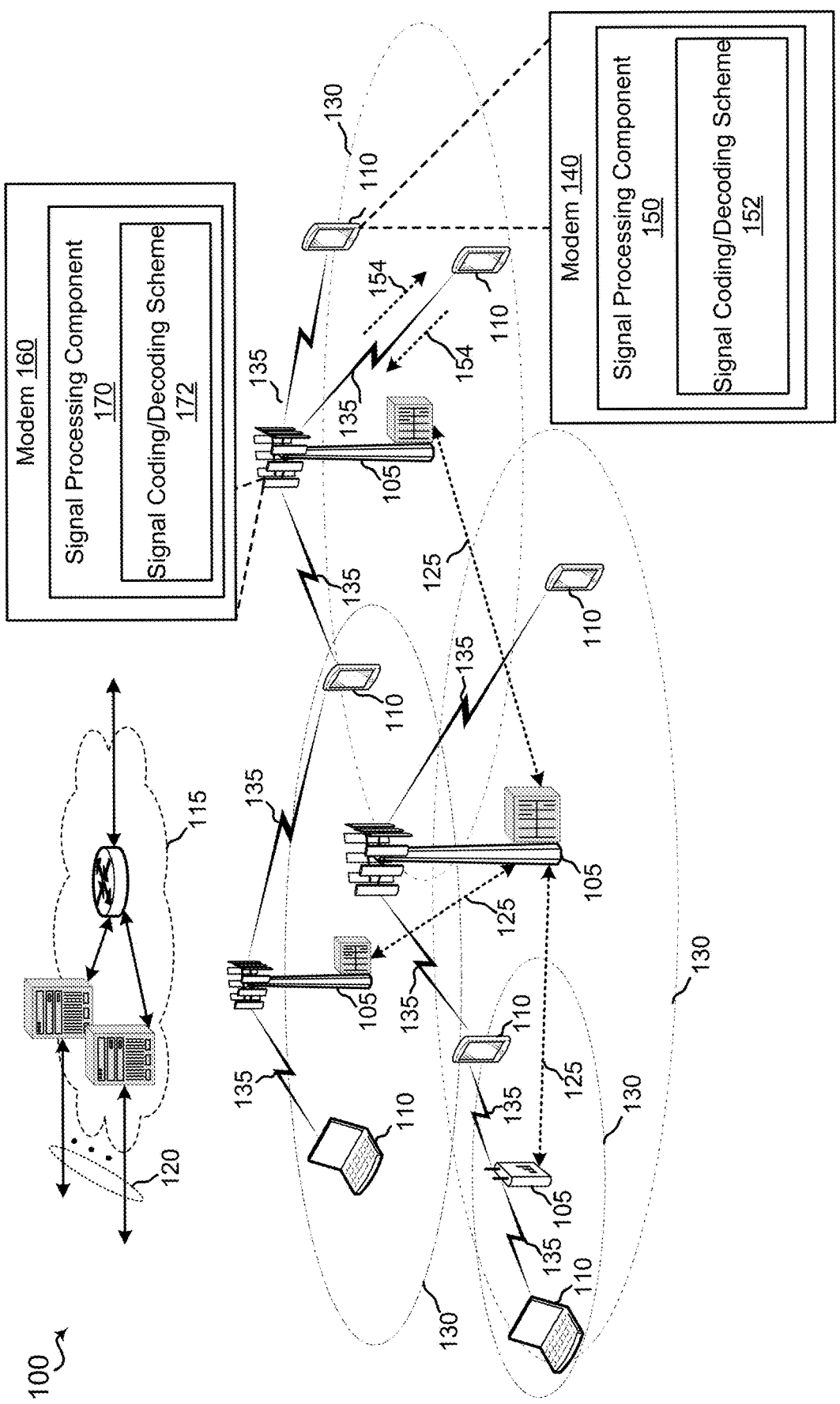
FIG. 1 is a schematic diagram of a wireless communication network including at least one user equipment (UE) having a signal processing component configured according to this disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to using pilots inserted before the discrete Fourier transform (DFT) spreading as phase noise tracking reference signal (PTRS). More specifically, disclosed is an apparatus and method of splitting single symbol DFT-s-OFDM data and reference signal into two specially-formatted time domain signals to be transmitted over two antennas to enable transmit diversity. The present solution overcomes problems in combining DFT-s-OFDM and transmit diversity, in some aspects, by splitting the DFT-s-OFDM symbol to avoiding breaking the single-carrier property of the DFT-s-OFDM transmission, and by including the reference signal (e.g., a demodulation reference symbol (DMRS) or a PTRS) within each time domain signal to allow for separate channel estimation on each antenna.

Although the description herein and examples may refer to the case of two transmit antennas, it is clear that the same technique could be applied to more than two antennas. One approach to this is by grouping the antennas into pairs and applying the technique on each pair. Another approach is to split the single DFT-s-OFDM symbol into more than two sub parts, apply the space-time block coding (STBC) encoding across the resulting sub parts, and including a TDM RS (DMRS or phase noise tracking reference signal (PTRS)) for each transmit antenna, to create the transmitted signal for each transmit antenna.

In other implementations, rather than being used for transmit diversity, the two specially-formatted time domain signals may be utilized instead to support user equipment (UE) multiplexing.

In another implementation, the two transmit antennas described above may be virtual antennas that are mapped to a physical antenna using a precoding matrix. In this case, the TDM separation of the reference signals from the two transmit antennas may be utilized for the virtual antennas but not for the physical antennas.

In a further implementation, when the above-described solution is applied to a single DFT-s-OFDM symbol, then no separate PTRS may be necessary. If the above-described solution is applied to multiple DFT-s-OFDM symbols, the above-described reference signal may be a PTRS, at least on a subset of DFT-s-OFDM symbols.

Additionally, in another implementation, the input into a discrete Fourier transform (DFT) to create the DFT-s-OFDM symbols described above may instead be split and input into two smaller DFTs, whose outputs are multiplexed into a larger inverse discrete Fourier transform (IDFT). In this case, the two smaller DFTs by themselves would result in a single carrier waveform, however, the multiplexing makes the resulting waveform a multi-cluster transmission. In an aspect, the reference signal (e.g., DMRS or PTRS) can be inserted into each cluster.

Additional features of the present aspects are described in more detail below with respect to FIGS. 1-5.

It should be noted that the techniques described herein may be used for various wireless communication networks such as CDMA, TDMA, FDMA, OFDMA, SC-FDMA, DFT-s-OFDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a signal processing component 150 having a signal coding/decoding scheme 152 that, in one aspect, is configured to generate and transmit, or alternatively to receive, a single-carrier waveform 154 from multiple transmit antennas including both a reference signal and data in a discrete Fourier transform spread orthogonal frequency division multiplexing (DFT-s-OFDM) symbol. As mentioned above, it should be understood that SC-FDM and DFT-s-OFDM are two names of essentially similar technologies, however, DFT-s-OFDM is the terminology used in 3GPP specifications. In another aspect, signal coding/decoding scheme 152 may be applied to multiple DFT-s-OFDM symbols, in which case the reference signal may be a phase noise tracking reference signal (PTRS). In a further aspect, signal coding/decoding scheme 152 may be modified such that the input is fed into two smaller discrete Fourier transforms (DFTs), and the outputs are multiplexed into a larger inverse DFT (IDFT), making a multi-cluster DFT output that may have reference signals in each cluster. In another aspect, signal coding/decoding scheme 152 may be further modified such that two time domain signals that are transmitted over different antennas for transmit diversity may be associated with one or more virtual antennas that are mapped to a physical antenna using a precoding matrix. In yet another aspect, instead of the two time domain signals being associated with two different transmit antennas, they may associated with different UE to support UE multiplexing. Thus, in general, the present aspects relate to using pilots inserted before the discrete Fourier transform (DFT) spreading as phase noise tracking reference signal (PTRS).

Further, wireless communication network 100 includes at least one base station 105 with a modem 160 having a signal processing component 170 with a signal coding/decoding scheme 172 complimentary to signal coding/decoding scheme 152 (and its aspects described above) on UE 110. Signal coding/decoding scheme 172 is complimentary in the sense that it can receive and decode transmissions generated by signal coding/decoding scheme 152, and/or it can generate and transmit similar transmissions as those described above for signal coding/decoding scheme 152.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
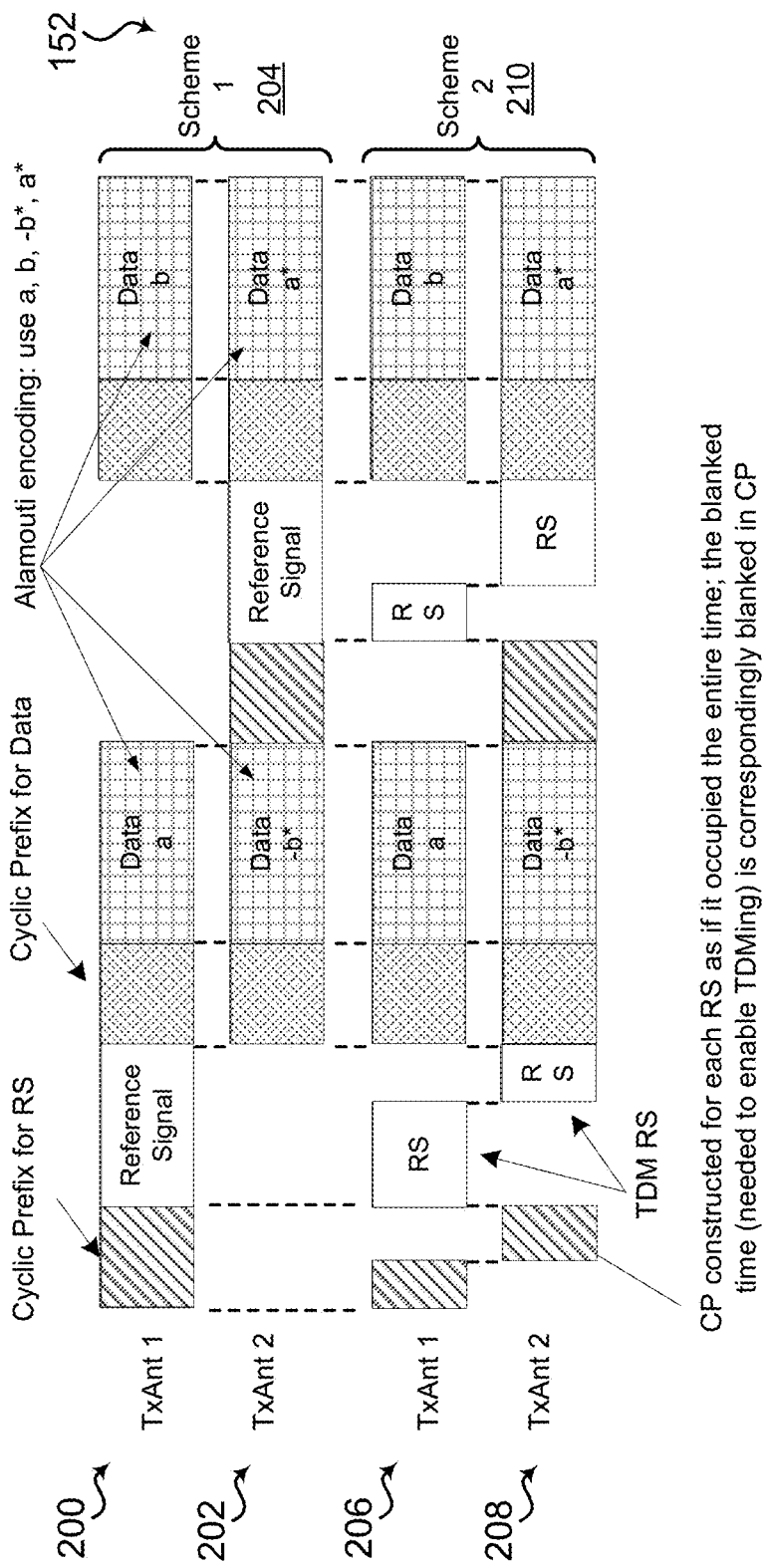
FIG. 2 is a set of block diagrams of example time domain symbol vectors formatted according to the present disclosure.

Referring to FIG. 2, in one example from the transmission perspective, a first time domain transmission symbol vector 200 for a first antenna (TxAnt 1) and a second time domain transmission symbol vector 202 for a second antenna (TxAnt 2) are based on a first version (scheme 1) 204 of signal coding/decoding scheme 152. Further, in another example, a first time domain transmission symbol vector 206 for a first antenna (TxAnt 1) and a second time domain transmission symbol vector 208 for a second antenna (TxAnt 2) are based on a second version (scheme 2) 210 of signal coding/decoding scheme 152.

In each of first version (scheme 1) 204 and second version (scheme 2) 210, the data represents a single DFT-s-OFDM data symbol that is split (e.g., prior to input to DFT-spreading, two symbols each with their own cyclic prefix are created), and then encoded according to a space-time block code (STBC), such as an Alamouti code, to create two time domain signals having spatial and temporal transmit diversity.

Additionally, a reference signal, such as a DMRS or a PTRS, may be inserted in each of the 2 split symbols that are created, as described above.

In first version (scheme 1) 204, the reference signal may be transmitted only from one antenna on the first symbol, and from the other antenna in second symbol, which allows separate channel estimation for each antenna.

In contrast, in second version (scheme 2) 210, the reference signal may be transmitted from both antennas on both symbols, but in a TDM fashion across the two antennas. Also, in this version, cyclic prefix also accounts for blank durations caused due to TDM. For example, TDM time allocations for the reference signal could be different in the two split symbols for each transmission, although the TDM time allocations maintain a total time across symbols to be same for both transmissions.

In some scenarios, second version (scheme 2) 210 may be preferred. For example, distributing the reference signal over both symbols leads to better channel estimation in a high Doppler case.

Alternatively, in a low-Doppler case, all the reference signals can be placed prior to the first symbol. For instance, when the entire reference signal precedes all data, then channel estimation can begin earlier, which results in a better (more efficient) decoding timeline.

Thus, UE 110 operating signal processing component 150 and/or base station 105 operating signal processing component 170 according to either first version (scheme 1) 204 or second version (scheme 2) 210 of signal processing scheme 152 or signal processing scheme 172 can generate and transmit a single-carrier waveform from multiple transmit antennas including both a reference signal and data in a single-carrier frequency division multiplexing (DFT-s-OFDM) symbol.

Figure 3A:
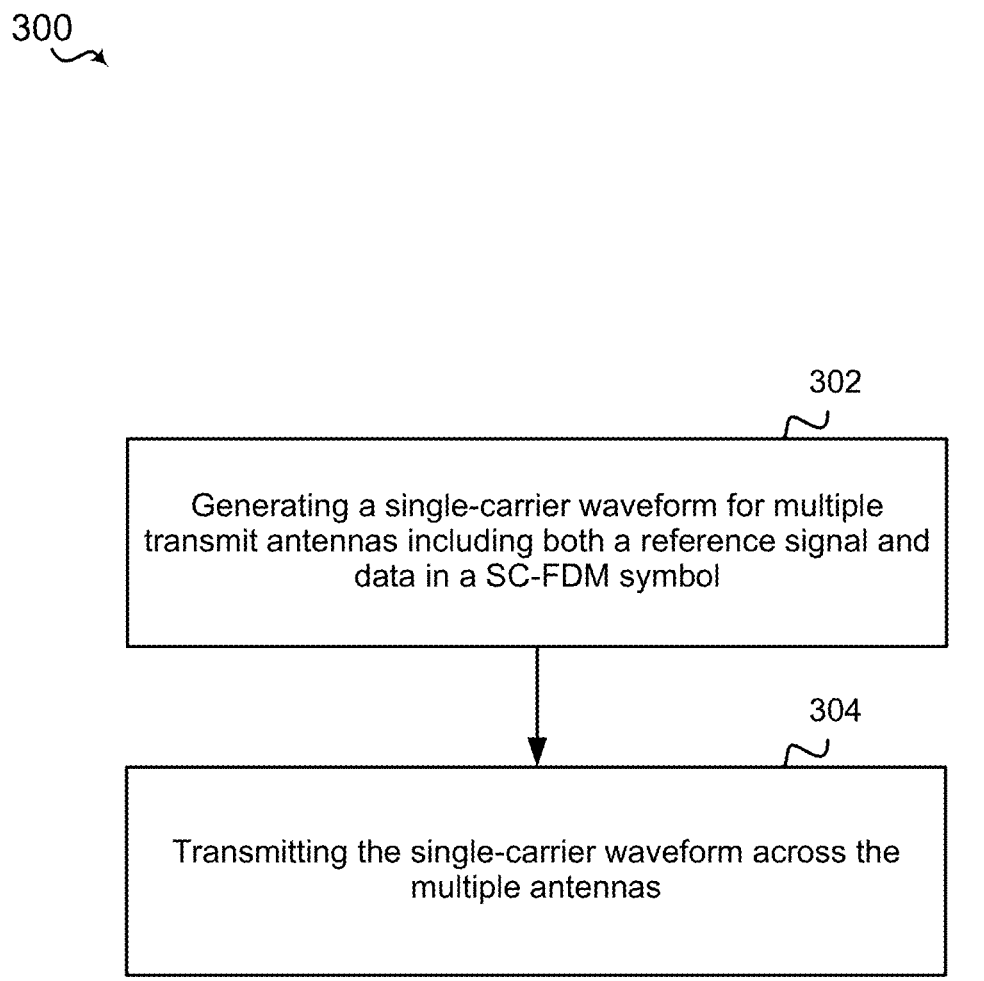

Referring to FIG. 3A, an example method 300 of wireless communications includes, at block 302, generating a single-carrier waveform for multiple transmit antennas including both a reference signal and data in a DFT-s-OFDM symbol. Additionally, at block 304, method 300 further includes transmitting the single-carrier waveform across the multiple antennas.

Optionally, method 300 may include transmitting the reference signal from only a first antenna on a first symbol, and from only a second antenna on a second symbol.

In another option, method 300 may include transmitting the reference signal from both a first antenna and a second antenna on both of a first symbol and a second symbol and in a TDM fashion. In this option, a TDM time allocation for the reference signal may be different in each of the first symbol and the second symbol, although a total time of the TDM time allocation is the same across both the first symbol and the second symbol. Further, this option may include positioning all of the reference signal prior to the first symbol, or distributing the reference signal over both of the first symbol and the second symbol.

For example, in an aspect, the generating and transmitting of the single-carrier waveform may be performed by UE 110 operating signal processing component 150 and signal processing scheme 152, and/or base station 105 operating signal processing component 170 and signal processing scheme 172 in conjunction with one or more processors, memories, transceivers, RF front ends, and antennas.

Further, for example, in some aspects the generating of the single-carrier waveform may include inputting N blocks of symbols (or at least the split symbols)(e.g., in time domain) into an N-point DFT to obtain a frequency domain representation of the input symbols, mapping each of the N DFT outputs to one of M (>N) orthogonal subcarriers that can be transmitted, resulting in a set of complex carrier amplitudes, performing an M-point inverse DFT (IDFT) to transform the complex carrier amplitudes to a complex time domain signal, where each complex time domain signal modules a single frequency carrier and all the symbols are transmitted sequentially. The receiver can utilize a reverse process to decode the received signal.

Also, in another example, the generating of the single-carrier waveform may include receiving a symbol sequence for transmission including the data and the reference signal, creating an DFT-s-OFDM data symbol for the data and an DFT-s-OFDM reference signal symbol for the reference signal, splitting the DFT-s-OFDM data symbol in to a first single carrier time domain (SC-TD) data symbol and a second SC-TD data symbol, splitting the DFT-s-OFDM reference signal symbol into a first SC-TD reference signal symbol and a second SC-TD reference signal symbol, applying a space-time block code (STBC) to the first SC-TD data symbol and the second SC-TD data symbol to define first STBC data and second STBC data corresponding to the first SC-TD data symbol and third STBC data and fourth STBC data corresponding to the second SC-TD data symbol, generating a first time domain signal that includes the first STBC data in a first part and the third STBC data in a second part, generating a second time domain signal that includes the fourth STBC data in the first part and the second STBC data in the second part, including the first SC-TD reference signal symbol in the first time domain signal and the second SC-TD reference signal symbol in the second time domain signal, wherein the first SC-TD reference signal symbol and the second SC-TD reference signal symbol are located in non-interfering symbols or non-interfering portions of symbols, and transmitting the first time domain signal and the second time domain signal over different antennas. Additionally, this aspect may include creating respective cyclic prefixes based on each of the respective STBC data and the SC-FD reference signal symbols in each of the first time domain signal and the second time domain signal.

As mentioned above, it should be noted that although the description herein and examples may refer to the case of two transmit antennas, it should be understood that the same technique could be applied to more than two antennas. One approach to this is by grouping the antennas into pairs and applying the technique on each pair. Another approach is to split the single DFT-s-OFDM symbol into more than two sub parts, apply the STBC encoding across the resulting sub parts, and including a TDM RS (DMRS or PTRS) for each transmit antenna, to create the transmitted signal for each transmit antenna.

In another aspect, the present disclosure provides considerations on PTRS with respect to the above-noted signal coding/decoding scheme 152 (or 172). When using signal coding/decoding scheme 152 (or 172) only for the single DFT-s-OFDM symbol, no separate PCRS may be required because phase noise mainly causes phase drift across multiple symbols. Thus, the above-described single symbol solution may be unaffected.

When extending signal coding/decoding scheme 152 (or 172) for use across multiple DFT-s-OFDM symbols, however, then PCRS may be included in at least some portion of the above-described reference signal. For example, this extension of signal coding/decoding scheme 152 (or 172) may be used for multiple symbols such as, but not limited to, long PUCCH/PUSCH with STBC.

In this case, this extension of signal coding/decoding scheme 152 (or 172) may include splitting each of the multiple DFT-s-OFDM symbols as discussed above. Alternatively, the DFT-s-OFDM symbols may be paired, and the above solution may be used across pairs. In this approach, splitting may be necessary only for a single unpaired symbol (if there is one).

Additionally, in an extension of signal coding/decoding scheme 152 (or 172), the reference signal in FIG. 2, that was a DMRS in the main solution, may be replaced with a PTRS, at least on a subset of the DFT-s-OFDM symbols. In this case of using PTRS, the reference signal overhead can be reduced relative to when DMRS is used as the reference signal, depending on a strength of the phase noise.

For example, one implementation of this aspect may include the procedure of signal coding/decoding scheme 152 (or 172) either applied to split each of multiple DFT-s-OFDM symbols, or used across pairs of multiple DFT-s-OFDM symbols, wherein the reference signal includes a phase noise tracking reference signal on at least a subset of the multiple DFT-s-OFDM symbols.

Additionally, this extension of signal coding/decoding scheme 152 (or 172) can be applied even in the absence of transmit diversity. For instance, the PTRS can be inserted within a single DFT-s-OFDM symbol, with possibly lower overhead, on at least a subset of the multiple DFT-s-OFDM symbols.

For example, referring to FIG. 3B, one implementation of this aspect may include a method 310 for transmission of a single-carrier waveform including generating a single-carrier waveform from a single transmit antenna including both a reference signal and data in multiple DFT-s-OFDM symbols, the reference signal comprises a phase noise tracking reference signal (PTRS), at block 312, and transmitting, at block 314, the single-carrier waveform via the single transmit antenna.

In another aspect, the present disclosure includes a variation of the above signal coding/decoding scheme 152 (or 172) that may be utilized, but that breaks the single-carrier property.

For example, instead of splitting the DFT-s-OFDM symbol into two, the input to the DFT precoding for DFT-s-OFDM could be split into two smaller DFTs, whose outputs are then multiplexed into the larger IDFT.

The multiplexing may include FDM multiplexing, either contiguous in frequency, or interleaved. In some instance, interleaved multiplexing is preferable so that Alamouti encoded symbol-pairs see approximately the same channel.

Each of the smaller DFT by itself would result in a single carrier waveform, however, the FDM may break this property, making it a "multi-cluster" transmission (2 clusters). This result may contribute some peak-to-average power ratio (PAPR) increase.

Additionally, this aspect may further include applying Alamouti encoding across the clusters. Further, in this aspect, a reference signal, e.g., DMRS or PTRS, can be inserted into each cluster.

Figure 3C:
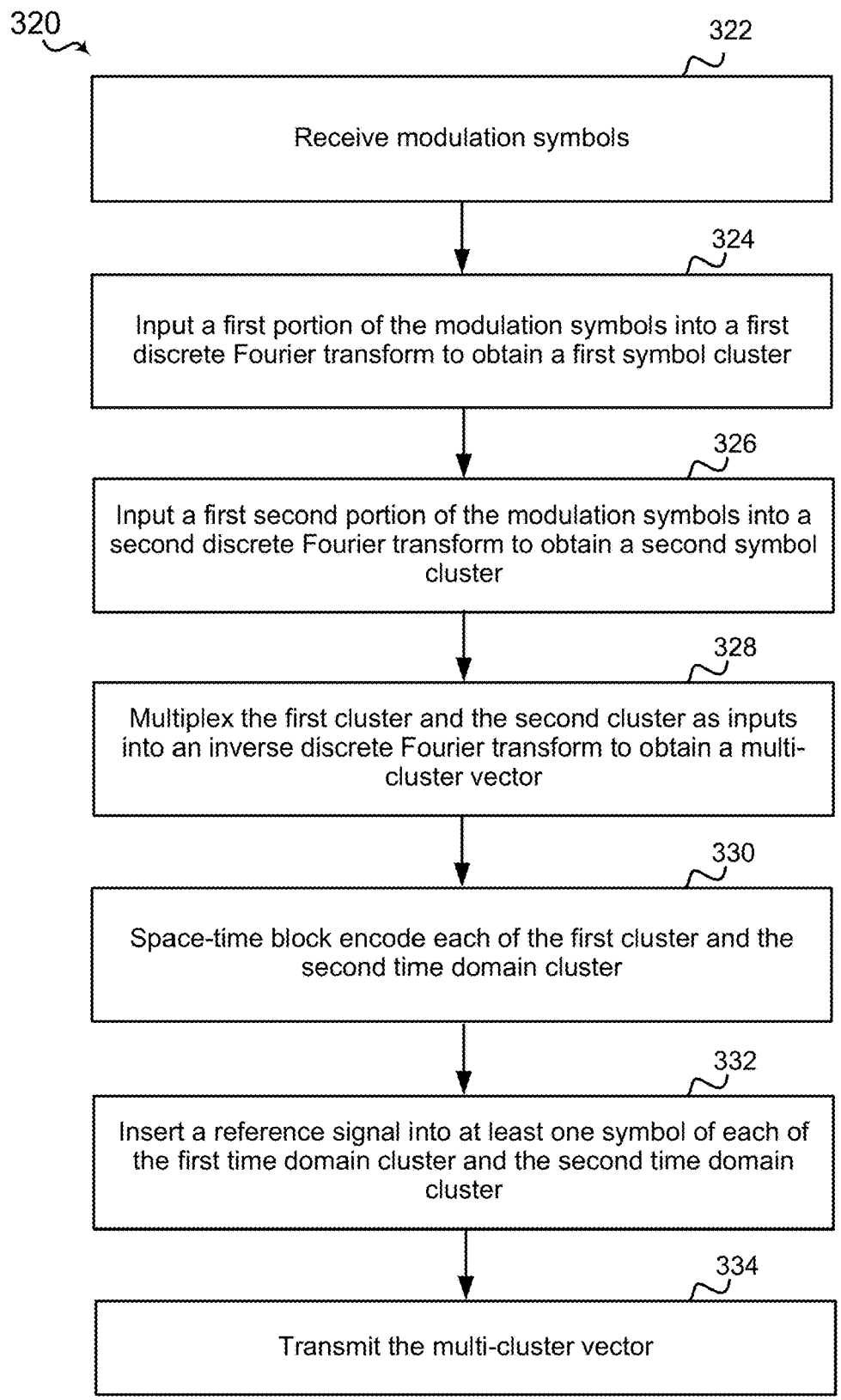

For example, referring to FIG. 3C, one implementation of this aspect may include a method 320 for transmission of a waveform including receiving modulation symbols at block 322 and inputting a first portion of the modulation symbols into a first discrete Fourier transform to obtain a first symbol cluster at block 324. At block 326, method 320 may further include inputting a first second portion of the modulation symbols into a second discrete Fourier transform to obtain a second symbol cluster. Further, at block 328, method 320 may include multiplexing the first cluster and the second cluster as inputs into an inverse discrete Fourier transform to obtain a multi-cluster vector, and, at block 330, space-time block encoding each of the first cluster and the second time domain cluster. Additionally, at block 332, method 320 may include inserting a reference signal into at least one symbol of each of the first time domain cluster and the second time domain cluster, and transmitting, at block 334, the multi-cluster vector. In this implementation, time-domain is at input to DFT, the output is in frequency domain, then the big inverse DFT (into which the 2 clusters are multiplexed) again outputs time-domain.

In another aspect, the present disclosure may include the use of virtual antennas and precoding to map the virtual antennas to a physical antenna. FIG. 2 shows TDM separation of the reference signal from two transmit antennas, however, this may not be strictly necessary. For instance, the transmit antennas shown in FIG. 2 could be virtual antennas that are mapped to actual antennas using a precoding matrix. It should be noted that a non-diagonal precoder may break the TDM property of the reference signals at the physical antennas. In this aspect, the precoder is either absorbed into the propagation channel (e.g., the same precoder for data and reference signal, but can be unknown to receiver), or is known to the receiver (e.g., the receiver can account for it). A non-diagonal precoder may also break the single-carrier property of the waveform at the physical antennas, due to the combining of two single-carrier waveforms necessary in such a precoding.

In another aspect, signal coding/decoding scheme 152 (or 172) may be used for multiplexing of transmitters instead of transmit diversity. For instance, the receiver of the multiplexed transmissions could be UE 110 receiving and decoding transmissions simultaneously or contemporaneously from two different eNodeBs 105, or a single eNodeB 105 receiving and decoding transmissions simultaneously or contemporaneously from two different UEs 110. For example, in this aspect, TxAnt 1 and TxAnt 2 are replaced by UE1 and UE2. Further, the Alamouti code is replaced by an overlay Walsh code. For instance, instead of (a, b) from TxAnt 1 and (-b*,a*) from TxAnt 2 based on the Alamouti code in the respective time domain transmission symbol vector 200, 202 and 206, 208, this aspect would have (a, a) from UE1 and (b,-b) from UE2 based on an overlay Walsh code.

Figure 3D:
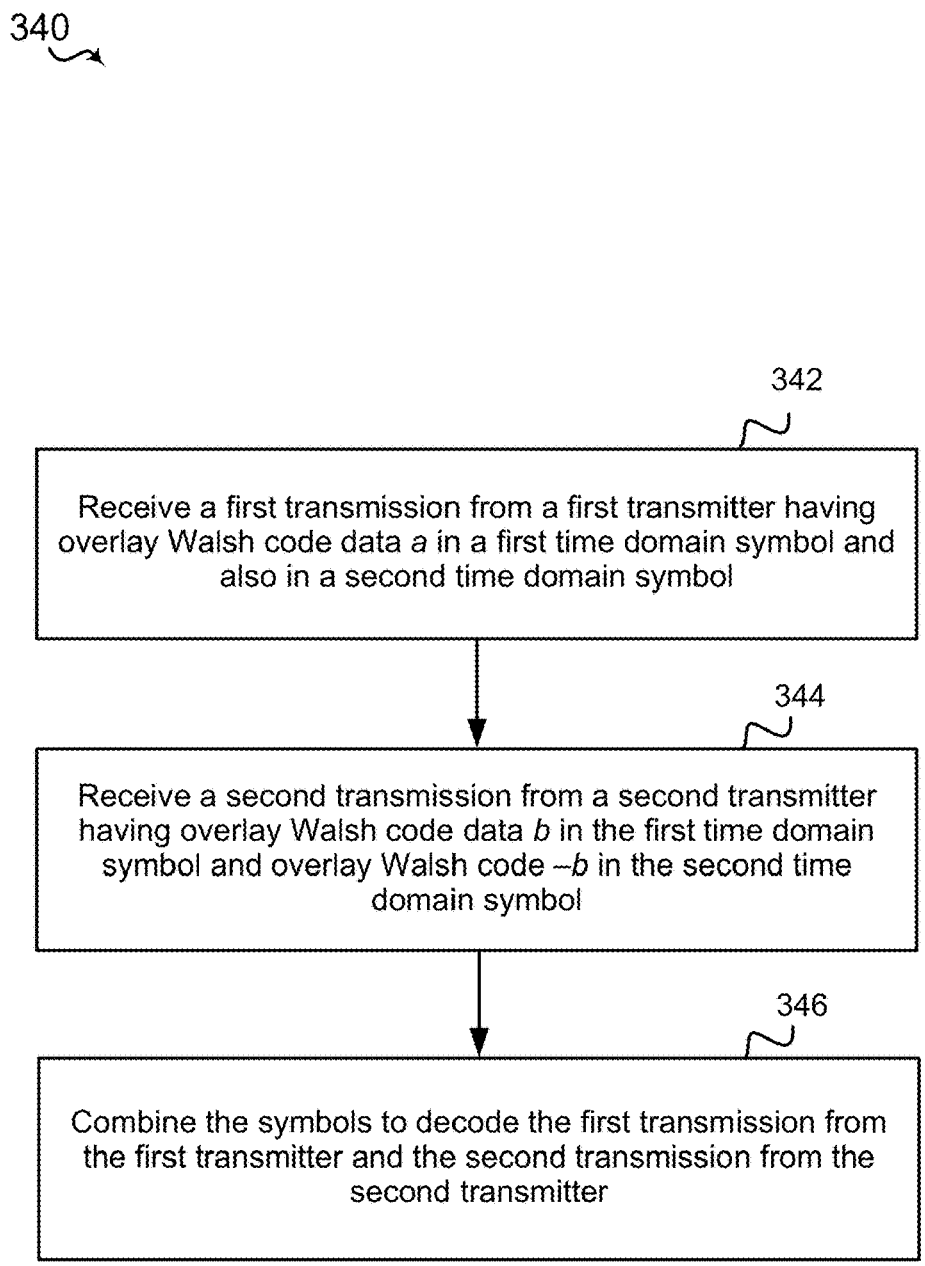

For example, referring to FIG. 3D, one implementation of this aspect may include a method 340 of wireless communication including receiving a first transmission from a first transmitter having overlay Walsh code data a in a first time domain symbol and also in a second time domain symbol at block 342. Also, at block 344, method 340 may include receiving a second transmission from a second transmitter having overlay Walsh code data b in the first time domain symbol and overlay Walsh code -b in the second time domain symbol. Additionally, at block 346, method 320 may include combining the symbols to decode the first transmission from the first transmitter and the second transmission from the second transmitter.

Figure 4:
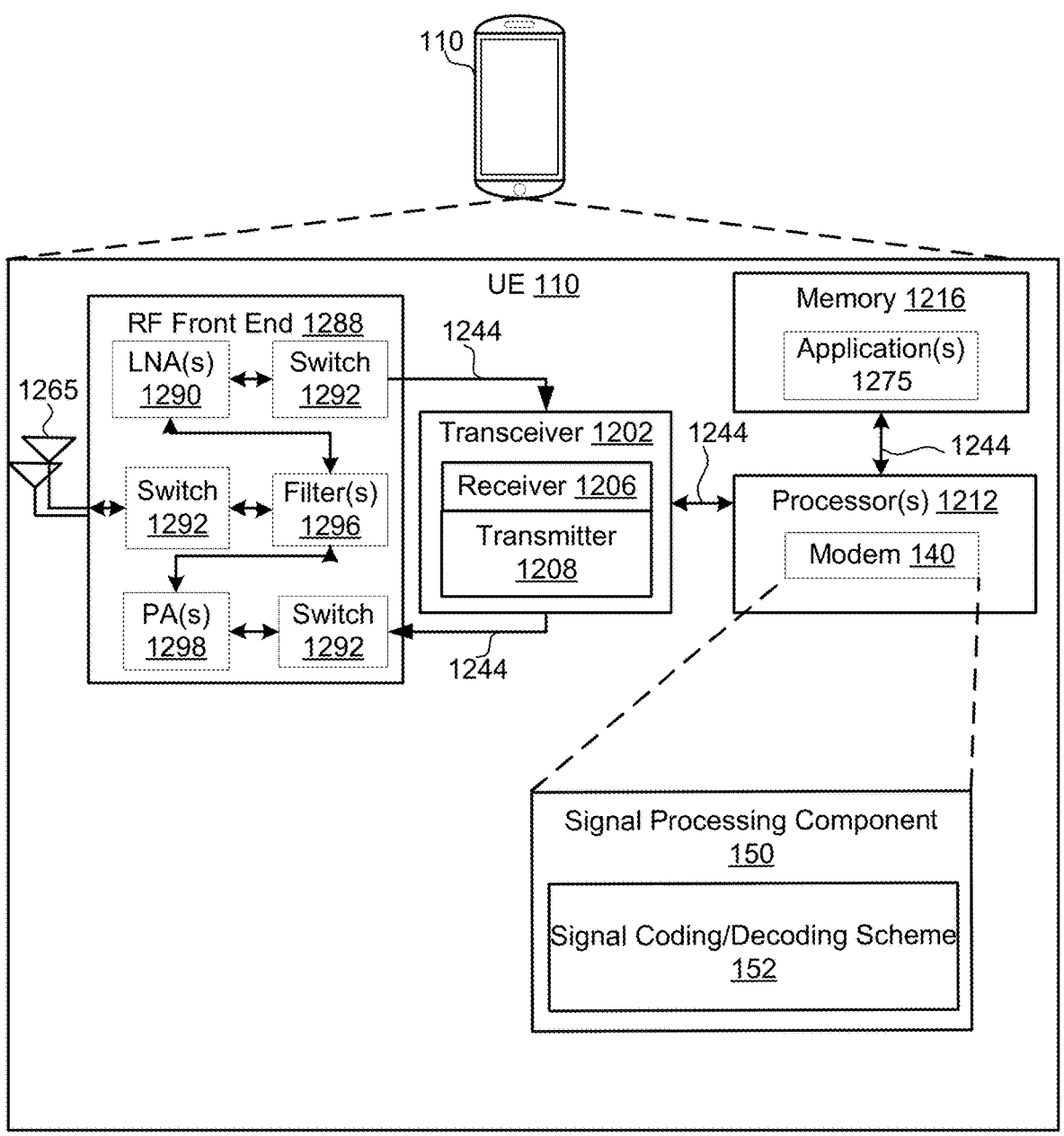
FIG. 4 is a schematic diagram of example components of the UE of FIG. 1.

Referring to FIG. 4, one example of an implementation of UE 110 may include a variety of components, some of which have already been described above, but including components such as one or more processors 1212 and memory 1216 and transceiver 1202 in communication via one or more buses 1244, which may operate in conjunction with modem 140 and signal processing component 150 and signal coding/decoding scheme 152 (and its modifications, described above) to enable one or more of the functions described herein. Further, the one or more processors 1212, modem 1214, memory 1216, transceiver 1202, RF front end 288 and one or more antennas 286, may be configured to support voice and/or data calls (simultaneously or non-simultaneously) in one or more radio access technologies.

In an aspect, the one or more processors 1212 can include a modem 1214 that uses one or more modem processors. The various functions related to signal processing component 150 and signal coding/decoding scheme 152 may be included in modem 140 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 140 associated with signal processing component 150 and signal coding/decoding scheme 152 may be performed by transceiver 1202.

Also, memory 1216 may be configured to store data used herein and/or local versions of applications 1275 or signal processing component 150 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining signal processing component 150 and/or one or more of its subcomponents, and/or data associated therewith, when UE 110 is operating at least one processor 1212 to execute signal processing component 150 and/or one or more of its subcomponents.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 105. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, UE 110 may include RF front end 1288, which may operate in communication with one or more antennas 1265 and transceiver 1202 for receiving and transmitting radio transmissions, for example, wireless communications transmitted by at least one base station 105 or wireless transmissions transmitted by UE 110. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 1202 to operate at a specified frequency and power level based on the UE configuration of the UE 110 and the communication protocol used by modem 140.

In an aspect, modem 140 can be a multiband-multimode modem, which can process digital data and communicate with transceiver 1202 such that the digital data is sent and received using transceiver 1202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 5:
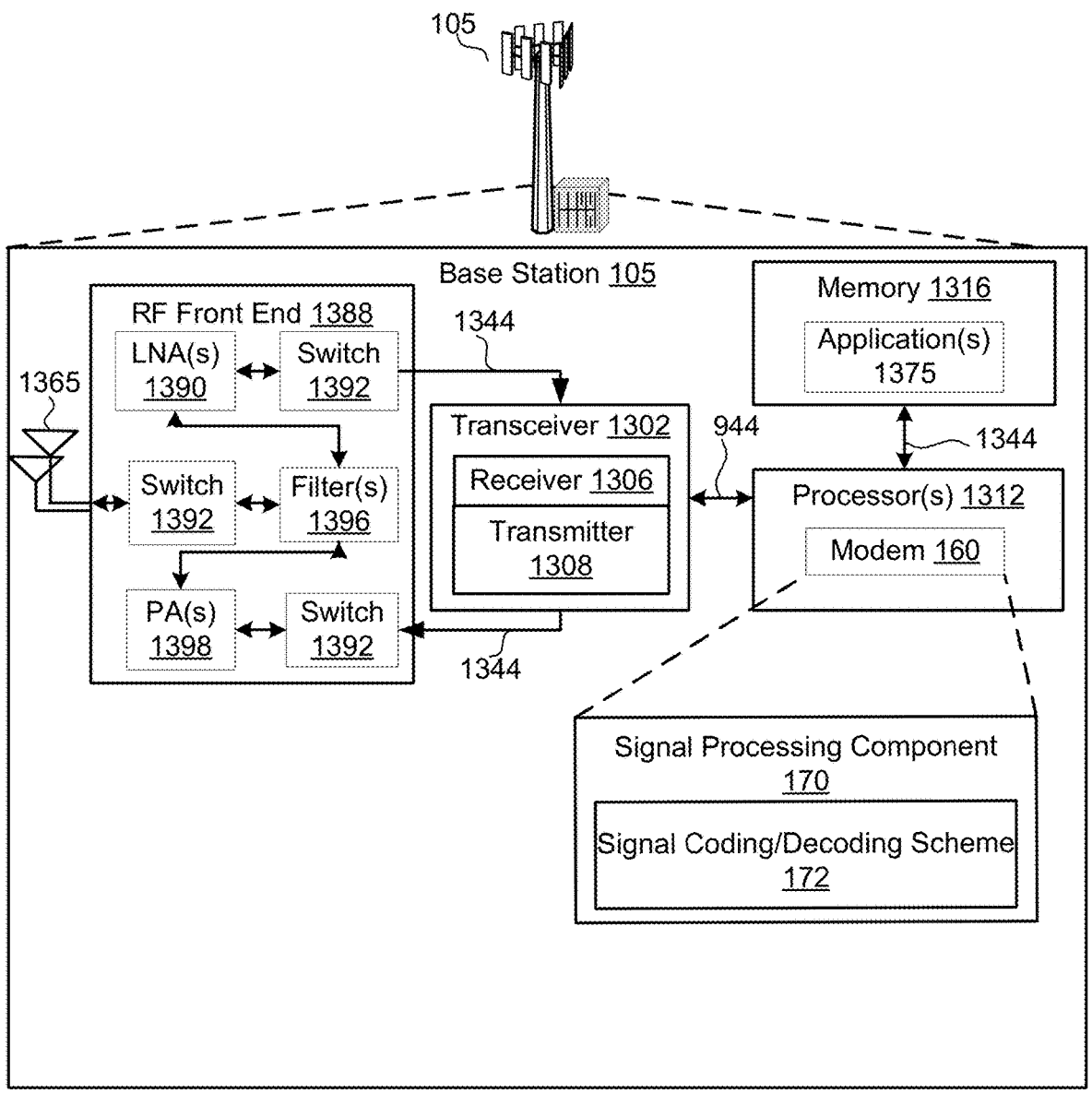
FIG. 5 is a schematic diagram of example components of the base station of FIG. 1.

Referring to FIG. 5, one example of an implementation of base station 105 may include a variety of components, some of which have already been described above, but including components such as one or more processors 1312 and memory 1316 and transceiver 1302 in communication via one or more buses 1344, which may operate in conjunction with modem 160 and signal processing component 170 and signal coding/decoding scheme 172 to enable one or more of the functions described herein.

The transceiver 1302, receiver 1306, transmitter 1308, one or more processors 1312, memory 1316, applications 1075, buses 1344, RF front end 1388, LNAs 1390, switches 1392, filters 1396, PAs 1398, and one or more antennas 1365 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
receiving a first single-carrier waveform transmitted from a first transmit antenna including a reference signal and first data portion in a first symbol corresponding to a split discrete Fourier transform spread orthogonal frequency division multiplexing (DFT-s-OFDM) symbol;
receiving a second single-carrier waveform transmitted from a second transmit antenna including the reference signal and second data portion in a second symbol corresponding to the split DFT-s-OFDM symbol;
combining the first single-carrier waveform received from the first transmit antenna and the second single-carrier waveform received from the second transmit antenna to define a combined waveform; and
decoding the combined waveform.

2. The method of claim 1,
wherein the reference signal is received on both the first symbol associated with the first single-carrier waveform and the second symbol associated with the second single-carrier waveform.

3. The method of claim 1,
wherein the reference signal is received on both of the first symbol and the second symbol associated with both the first single-carrier waveform and the second single-carrier waveform, in a time division multiplexing (TDM) fashion.

4. The method of claim 3, wherein a TDM time allocation for the reference signal is same or different in each of the first symbol and the second symbol.

5. The method of claim 4, wherein a total time of the TDM time allocation is the same across both the first symbol and the second symbol.

6. The method of claim 1, wherein all of the reference signal is received prior to the first symbol.

7. The method of claim 1, wherein each of multiple DFT-s-OFDM symbols is split across pairs of multiple DFT-s-OFDM symbols.

8. The method of claim 7, wherein the reference signal includes a phase noise tracking reference signal on at least a subset of the multiple DFT-s-OFDM symbols.

9. A wireless communication device, comprising:
a memory; and
at least one processor in communication with the memory and configured to:
receive a first single-carrier waveform transmitted from a first transmit antenna including a reference signal and first data portion in a first symbol corresponding to a split discrete Fourier transform spread orthogonal frequency division multiplexing (DFT-s-OFDM) symbol;
receive a second single-carrier waveform transmitted from a second transmit antenna including the reference signal and second data portion in a second symbol corresponding to the split DFT-s-OFDM symbol;
combine the first single-carrier waveform received from the first transmit antenna and the second single-carrier waveform received from the second transmit antenna to define a combined waveform; and
decode the combined waveform.

10. The wireless communication device of claim 9, wherein the reference signal is received on both the first symbol associated with the first single-carrier waveform and the second symbol associated with the second single-carrier waveform.

11. The wireless communication device of claim 9, wherein the reference signal is received on both of the first symbol and the second symbol in a time division multiplexing (TDM) fashion.

12. The wireless communication device of claim 11, wherein a TDM time allocation for the reference signal is same or different in each of the first symbol and the second symbol.

13. The wireless communication device of claim 12, wherein a total time of the TDM time allocation is the same across both the first symbol and the second symbol.

14. The wireless communication device all of the reference signal is received prior to the first symbol.

15. The wireless communication device of claim 9, wherein each of multiple DFT-s-OFDM symbols is split across pairs of multiple DFT-s-OFDM symbols.

16. The wireless communication device of claim 15, wherein the reference signal includes a phase noise tracking reference signal on at least a subset of the multiple DFT-s-OFDM symbols.

17. A wireless communication device comprising:
means for receiving a first single-carrier waveform transmitted from a first transmit antenna including a reference signal and first data portion in a first symbol corresponding to a split discrete Fourier transform spread orthogonal frequency division multiplexing (DFT-s-OFDM) symbol;
means for receiving a second single-carrier waveform transmitted from a second transmit antenna including the reference signal and second data portion in a second symbol corresponding to the split DFT-s-OFDM symbol;
means for combining the first single-carrier waveform received from the first transmit antenna and the second single-carrier waveform received from the second transmit antenna to define a combined waveform; and
means for decoding the combined waveform.

18. The wireless communication device of claim 17, wherein the reference signal is received on both the first symbol associated with the first single-carrier waveform and the second symbol associated with the second single-carrier waveform.

19. The wireless communication device of claim 17, wherein the reference signal is received on both of the first symbol and the second symbol in a time division multiplexing (TDM) fashion.

20. The wireless communication device of claim 19, wherein a TDM time allocation for the reference signal is same or different in each of the first symbol and the second symbol.

21. The wireless communication device of claim 20, wherein a total time of the TDM time allocation is the same across both the first symbol and the second symbol.

22. The wireless communication device of claim 19, wherein all of the reference signal is received prior to the first symbol.

23. The wireless communication device of claim 17, wherein each of multiple DFT-s-OFDM symbols is split across pairs of multiple DFT-s-OFDM symbols, and wherein the reference signal includes a phase noise tracking reference signal on at least a subset of the multiple DFT-s-OFDM symbols.

24. A non-transitory computer-readable medium storing computer code executable by a processor for wireless communications, comprising code for:
receiving a first single-carrier waveform transmitted from a first transmit antenna including a reference signal and first data portion in a first symbol corresponding to a split discrete Fourier transform spread orthogonal frequency division multiplexing (DFT-s-OFDM) symbol;
receiving a second single-carrier waveform transmitted from a second transmit antenna including the reference signal and second data portion in a second symbol corresponding to the split DFT-s-OFDM symbol;
combining the first single-carrier waveform received from the first transmit antenna and the second single-carrier waveform received from the second transmit antenna to define a combined waveform; and
decoding the combined waveform.

25. The computer-readable medium of claim 24, wherein the reference signal is received on the first symbol associated with the first single-carrier waveform and the second symbol associated with the second single-carrier waveform.

26. The computer-readable medium of claim 24, wherein the reference signal is received on both of the first symbol and the second symbol in a time division multiplexing (TDM) fashion.

27. The computer-readable medium of claim 26, wherein a TDM time allocation for the reference signal is same or different in each of the first symbol and the second symbol.

28. The computer-readable medium of claim 27, wherein a total time of the TDM time allocation is the same across both the first symbol and the second symbol.

29. The computer-readable medium of claim 26, wherein all of the reference signal is received prior to the first symbol.

30. The computer-readable medium of claim 24, wherein each of multiple DFT-s-OFDM symbols is split across pairs of multiple DFT-s-OFDM symbols, and wherein the reference signal includes a phase noise tracking reference signal on at least a subset of the multiple DFT-s-OFDM symbols.

* * * * *